United States Patent
Wang

(10) Patent No.: US 6,625,423 B1
(45) Date of Patent: Sep. 23, 2003

(54) CONTROL DEVICE FOR FORWARDING INCOMING CALL FROM MOBILE PHONE TO PHONE SET COUPLED TO PUBLIC TELECOM NETWORK

(76) Inventor: Steven Wang, 3F, #87, Lane 120, Jung 3rd Street, Shijr Hen, Taipei (TW)

(*) Notice: Subject to any disclaimer, the term of this patent is extended or adjusted under 35 U.S.C. 154(b) by 537 days.

(21) Appl. No.: 09/676,010

(22) Filed: Sep. 29, 2000

(51) Int. Cl.⁷ ................................. H04B 1/40
(52) U.S. Cl. .................. 455/74.1; 455/462; 455/465; 455/552.1
(58) Field of Search ................. 455/414, 417, 455/435, 445, 560–561, 403, 550–551, 557, 564, 573, 575, 462, 465, 552, 444, 74.1; 379/201.01, 210.03–212.01, 419, 358–359

(56) References Cited

U.S. PATENT DOCUMENTS

| | | | | |
|---|---|---|---|---|
| 5,915,224 A | * | 6/1999 | Jonsson | 455/552.1 |
| 6,151,500 A | * | 11/2000 | Cardina et al. | 455/435.2 |
| 6,188,888 B1 | * | 2/2001 | Bartle et al. | 455/417 |
| 6,226,536 B1 | * | 5/2001 | Miyashita | 455/567 |
| 6,314,303 B1 | * | 11/2001 | Phipps | 455/555 |
| 6,466,799 B1 | * | 10/2002 | Torrey et al. | 455/462 |

* cited by examiner

Primary Examiner—Lee Nguyen
Assistant Examiner—Tuan Tran

(57) ABSTRACT

A switch device for forwarding an incoming call from a mobile phone to a phone set coupled to a public telecom network, allowing the user to answer the incoming call of the mobile phone by a phone set, is disclosed. The switch device includes a central processing unit, a communication loop switching circuit for establishing a communication loop for the phone set, a relay controllable by the central processing unit, an incoming call detecting circuit for detecting the incoming call of the mobile phone and correspondingly generating an output signal to the central processing unit, an audio signal converting circuit for converting the audio signal carried on the earphone connecting lines and the microphone connecting lines of the mobile phone into an audio signal form adapted to be coupled to the phone set, and a power supplying circuit for supplying a power source to the audio signal converting circuit. The switch device further includes a ring generation circuit for generating a simulating ring signal when the incoming call is detected by the incoming call detecting circuit.

7 Claims, 5 Drawing Sheets

CONTROL DEVICE FOR FORWARDING INCOMING CALL FROM MOBILE PHONE TO PHONE SET COUPLED TO PUBLIC TELECOM NETWORK

BACKGROUND OF THE INVENTION

1. Field of the Invention

The present invention relates to a control device for mobile phone battery charger, and more particularly to a mobile phone battery charger with a switch device capable of allowing the user to answer the incoming call of a mobile phone mounted on the battery charger by an indoor phone set.

2. Description of the Prior Art

In the modem society, mobile phones are wildly used in communications. It is noted there are some disadvantages as follows in using the mobile phones:

1. The battery pack of the mobile phone needs to be charged when the electric energy of the battery is exhausted. When an incoming call is forwarded to the mobile phone, the user of the mobile phone is limited to answer the incoming call by the mobile phone, which may cause an interrupt to the charging of the mobile phone battery. It is noted that the interrupt of the charging of the mobile phone battery may cause an low efficiency to the battery pack.
2. The mobile phone battery pack normally incorporates some specific function circuit modules, such as over-current protection circuit. Repeatedly and randomly mounting the mobile phone battery pack on the battery charger may damage the electronic circuit arranged in the battery pack.
3. The communication effect of the mobile phone may be influenced by environment where the mobile phone is used. The communication of the mobile phone may be interrupted due to displacement of the user. In comparison, the indoor phone set provides a relatively good communication effect than the mobile phone.
4. The battery charger is normally placed on a table. When the mobile phone detects an incoming call, the user must move to the place where the battery charger is placed to answer the incoming call, which is very inconvenient in use.
5. The high frequency electromagnetic wave transmitted by he mobile phone is highly possible to influence the health of the user according to the medical research.

Thus, it is desirable to provide a switch device for the battery charger to allow the user to answer the incoming call of the mobile phone by an indoor phone set when the mobile phone is mounted on the mobile phone battery charger.

SUMMARY OF THE INVENTION

Consequently, a primary object of the present invention is to provide a mobile phone battery charger with a switch device allowing the user to answer the incoming call of the mobile phone by a phone set coupled to public telecom network.

Another object of the present invention is to provide a mobile phone battery charger having four audio signal connecting lines capable of connecting to audio signal contacts of the mobile phone when the mobile phone is placed on the battery charger. In addition, the battery charger is equipped with two phone set connecting lines connected to the phone set.

Another object of the present invention is to provide a mobile phone battery charger with an answering control switch and a battery charging circuit therein. Under control of the answering control switch, the user may answer the incoming call of the mobile phone by an indoor phone set. In addition, the mobile phone battery attached on the mobile phone may be charged continuously during answering the incoming call of the mobile phone.

A further object of the present invention is to provide a control device for answering an incoming call of a mobile phone by a phone set coupled to a pair of subscriber lines of a public telecom network.

To further understand the present invention, reference is made to the following detailed description of a preferred embodiment of the present invention, as well as the attached drawings, wherein:

BRIEF DESCRIPTION OF THE PREFERRED EMBODIMENT

DETAILED DESCRIPTION OF THE PREFERRED EMBODIMENT

Figure 1:
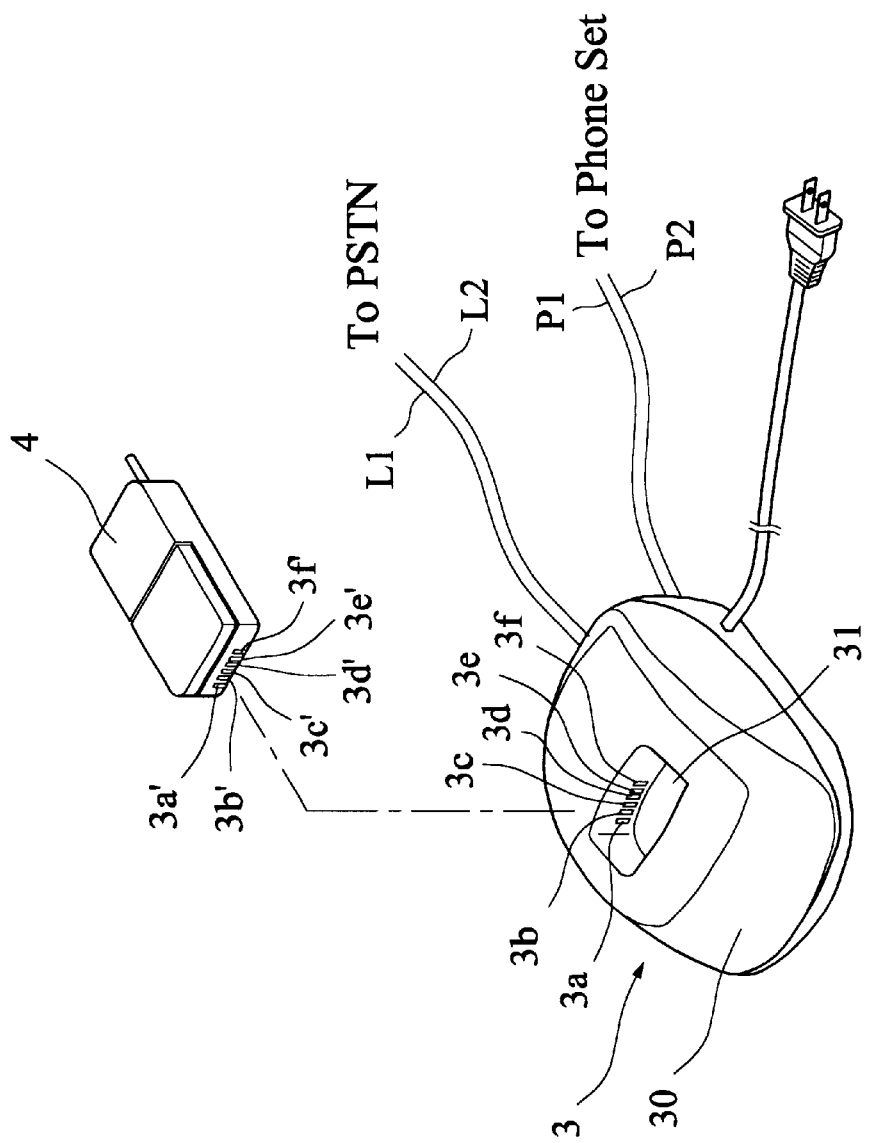
FIG. 1 is a perspective view showing a mobile phone battery charger in accordance with a preferred embodiment of the present invention.
Figure 2:
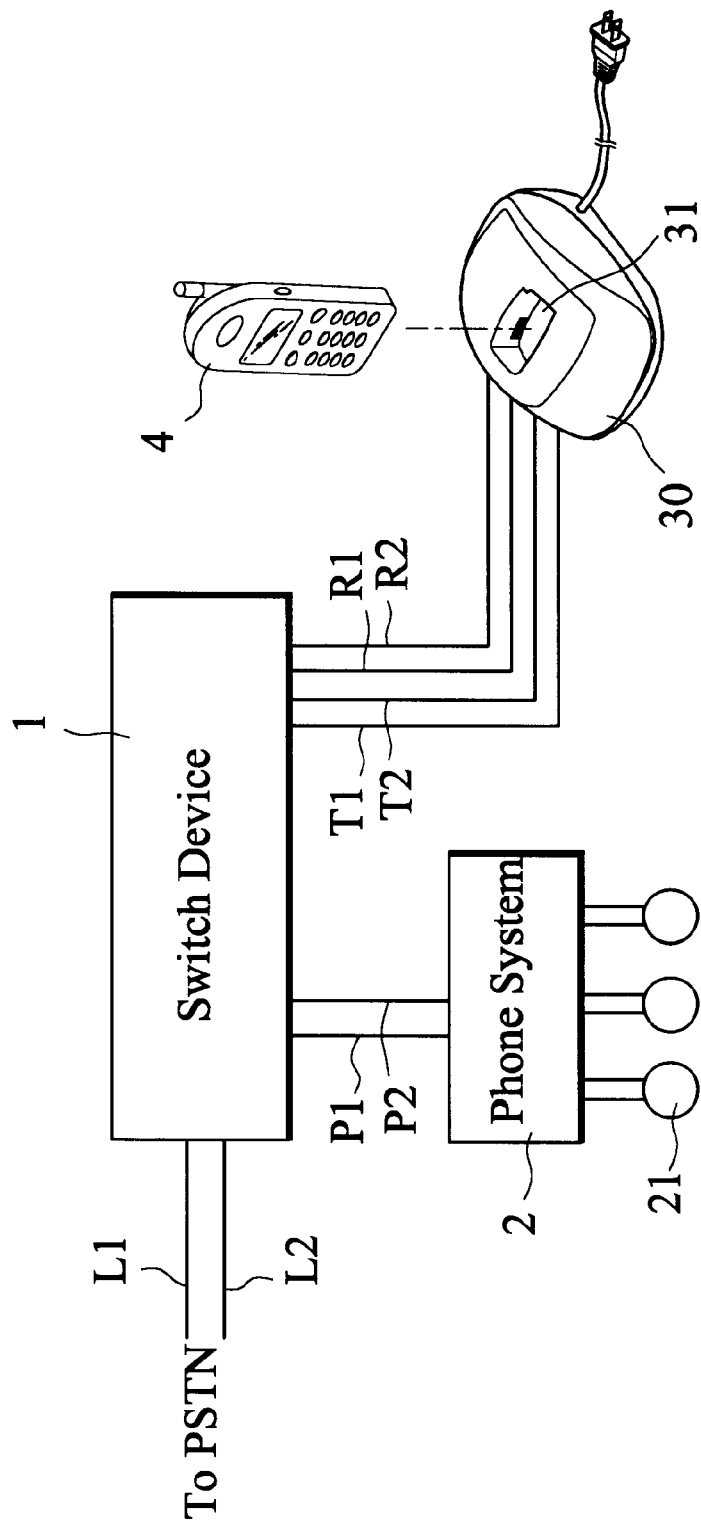
FIG. 2 is a system connection diagram of the present invention.

With reference to the drawings and in particular to FIGS. 1 and 2, wherein a battery charger constructed in accordance with a preferred embodiment of the present invention is shown, the mobile phone battery charger 3 is provided with a casing 30 with at least one concave portion 31 formed thereon.

A mobile phone attached with a mobile phone battery may be mounted in the concave portion 31. Typically, a number of output terminals $3a'$, $3b'$, $3c'$, $3d'$, $3e'$, and $3f'$ are arranged on the mobile phone 4, as shown in FIG. 1. Further, a number of contacts $3a$, $3b$, $3c$, $3d$, $3e$, and $3f$ are arranged on the concave portion 31, corresponding to the output terminals $3a'$, $3b'$, $3c'$, $3d'$, $3e'$, and $3f'$, of the mobile phone 4.

Two subscribe lines L1 and L2 are extended from the battery charger 3 and then connected to a public telecom network(abbreviated PSTN). Further, two phone set connecting lines P1 and P2 are extended from the battery charger 3 and then connected to a telephone system 2 comprising at least one indoor phone set 21. Alternatively, the phone set connecting lines P1 and P2 may directly connect to the phone set 21.

With reference to FIG. 2, the battery charger 3 includes a forwarding switch device 1 which may be arranged in the battery charger or in a form of external switch box connected to the battery charger. The switch device 1 includes two earphone connecting lines R1, R2, and two microphone connecting lines T1 and T2.

When a mobile phone 4 is mounted on the concave portion 31 of the battery charger 3, the earphone connecting lines R1 and R2 are connected to the earphone output terminals $3f'$ and $3e'$ of the mobile phone respectively via contacts $3f$ and $3e$. At the same time, the microphone connecting lines T1 and T2 are connected to the microphone output terminals 3*d*' and 3*c*' of the mobile phone respectively via contacts 3*d* and 3*c*.

In operation, when an incoming call to the mobile phone 4 is detected, the user may answer the incoming call by hanging off the phone set 21. At this time, the earphone connecting lines R1 and R2 and the microphone connecting lines T1 and T2 are electrically coupled to the phone set 21 via phone set connecting lines P1 and P2 under control of the switch device 1.

The switch device 1 of the present invention may be a manually operated switch or an automatic switching control circuit capable of automatically detecting the incoming call of the mobile phone and transferring the communication loop to the phone set.

Figure 3:
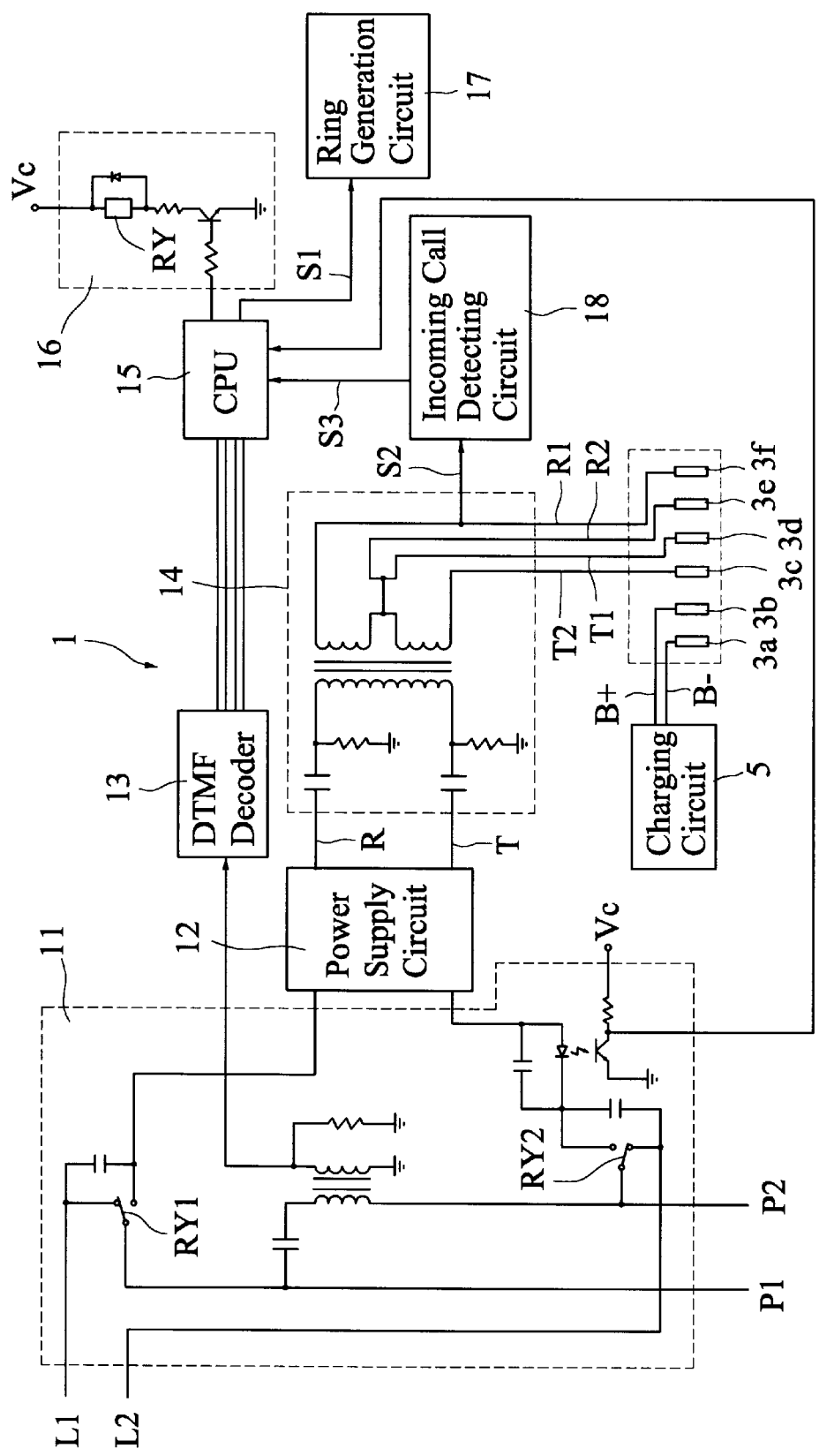
FIG. 3 is a circuit diagram of the present invention.

As shown in FIG. 3, the switch device 1 includes a communication loop switching circuit 11, a power supplying circuit 12, a DTMF decoding circuit 13, an audio signal converting circuit 14, a central processing unit 15, a relay 16, a ring generation circuit 17, and an incoming call detecting circuit 18.

The central processing unit 15 is capable of controlling the relay 16 by actuating the coil RY of the relay 16 through an output line. The relay 16 has two contact switches RY1 and RY2 actuated by the coil RY of the relay 16. The contact switches RY1 and RY2 are arranged in the communication loop switching circuit 11. So, the connecting lines P1 and P2 may be coupled to the subscriber lines L1 and L2 when both the contact switches RY1 and RY2 are at normally closed position. On the contrary, the connecting lines P1 and P2 are coupled to the mobile phone via connecting lines R1, R2, T1, and T2 when both the contact switches RY1 and RY2 are at normally open position.

The central processing unit 15 is capable of controlling the ring generation circuit 17 through an output line S1. When the incoming call detecting circuit 18 detects an incoming call of the mobile phone, the central processing unit 15 will actuate the ring generation circuit 17 to ring.

The incoming call detecting circuit 18 has an input line S2 connected to the earphone connecting line R1. So, when the mobile phone 4 is placed on the concave portion 31 of the battery charger 3, the input line S2 of the incoming call detecting circuit 18 may be coupled to the earphone output terminal 3*f*' of the mobile phone via the earphone connecting line R1. So, the incoming call detecting circuit 18 is capable of generating an output signal to the central processing unit 15 via an output line S3 when detecting an incoming call of the mobile phone.

DTMF decoding circuit 13 is used to receive Dual-tone Multi-frequency(abbreviated DTMF) signal sent from the phone set 21 and then decode the DTMF signal and send the decoded DTMF signal to the central processing unit 15.

The audio signal converting circuit 14 is used to convert 4-wired audio signal of the mobile phone into two-wired audio signal of the phone set. The audio signal converting circuit 14 is provided with two output lines R and T which are coupled to the communication loop switching circuit 11 via the power supplying circuit 12.

The power supplying circuit 12 is connected between the communication loop switching circuit 11 and the audio signal converting circuit 14 for supplying a power source to the switch device 1 of the present invention during answering the incoming call of the mobile phone 4 by the phone set 21.

Figure 4:
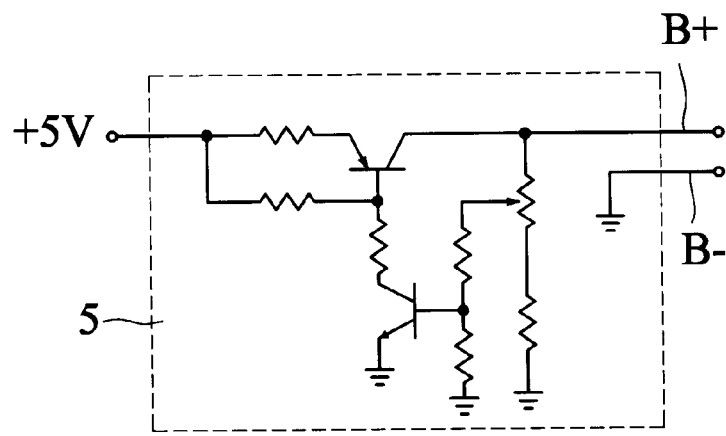
FIG. 4 is a circuit diagram of the charging circuit of FIG. 3.

In a preferred embodiment of the present invention, a battery charging circuit 5 is arranged in the casing 30 of the battery charger 3, so that the battery of the mobile phone 4 mounted in the concave portion 31 may be charged. FIG. 4 shows a further detailed control circuit of the battery charging circuit 5 of FIG. 3. The battery charging circuit 5 converts a DC power source +5V into a suitable charging power source to the mobile phone battery to be charged via terminals B+ and B−.

Figure 5:
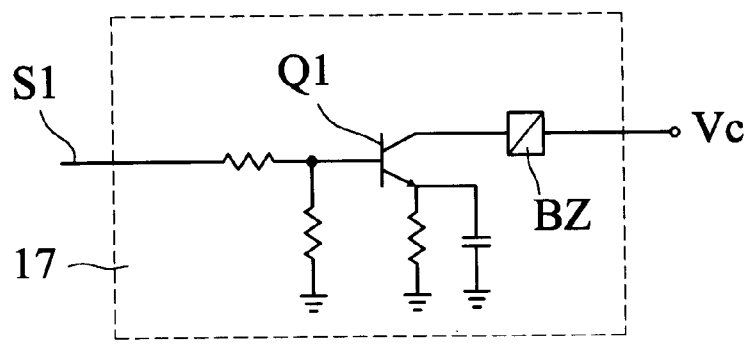
FIG. 5 is a circuit diagram of the ring generation circuit of FIG. 3.

FIG. 5 is a further detailed circuit diagram of the ring generation circuit 17 of FIG. 3. The ring generation circuit 17 comprises a transistor Q1 and a buzzer BZ. When the ring generation circuit 17 receives an actuating signal from line S1, the transistor Q1 will actuate the buzzer BZ to generate a simulating ring signal.

Figure 6:
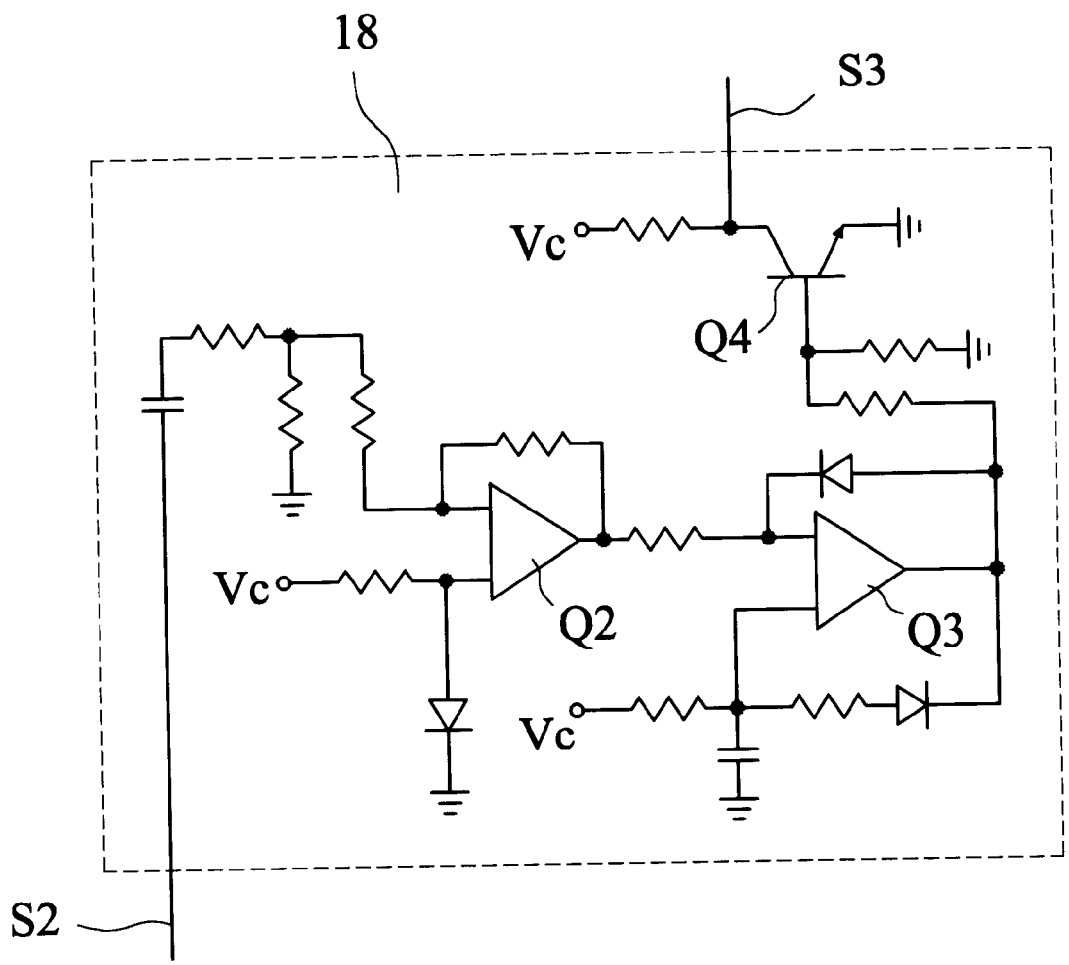
FIG. 6 is a circuit diagram of the incoming call detecting circuit of FIG. 3.

FIG. 6 is a further detailed circuit diagram of the incoming call detecting circuit 18 of FIG. 3, which mainly includes two amplifiers Q2 and Q3, a transistor Q4, and associated electronic components such as resistors and capacitors. When the incoming call detecting circuit 18 receives an incoming call signal through line S2, the received signal will be amplified by the amplifiers Q2 and Q3. Thereafter, the transistor Q4 is turned on to transmit an output signal through line S3 to the central processing unit 15.

The present invention may be operated in two operation modes. In the first operation mode, the contact switches RY1 and RY2 are at normally closed position, as shown in FIG. 3. So, the connecting lines P1 and P2 are coupled to the subscriber lines L1 and L2 through the contact switches RY1 and RY2.

In the second operation mode, the contact switches RY1 and RY2 are at normally open position, under control of the central processing unit 15. So, the connecting lines P1 and P2 are coupled to the output lines R and T of the audio signal converting circuit 14 via power supplying circuit 12.

When the detecting circuit 18 detects an incoming call through the earphone connecting line R1, it is capable of sending an output signal to the central processing unit 15 through line S3. The central processing unit 15 will actuate the ring generation circuit 17 to ring. At this time, if the user hangs off the phone set and then presses a predetermined key of the phone set, the central processing unit 15 will detect the predetermined key through the DTMF decoding circuit 13. Thereafter, the central processing unit 15 will actuate the relay 15 so as to switch the contact switches RY1 and RY2 to normally open position. Thus, the user may answer the incoming call of the mobile phone by the phone set.

Although the preferred embodiments of the present invention have been described to illustrate the present invention, it is apparent that changes and modifications in the specifically described embodiments can be carried out without departing from the scope of the invention which is intended to be limited only by the appended claims.

I claim:

1. A control device for answering an incoming call of a mobile phone by a phone set coupled to a pair of subscriber lines of a public telecom network, the mobile phone being provided with two earphone connecting lines and two microphone connecting lines for outputting an audio signal of the mobile phone, comprising:

a central processing unit;

a communication loop switching circuit having a pair of output lines coupled to the subscriber lines and a pair of phone set connecting lines coupled to the phone set, capable of establishing a communication loop for the phone set;

a relay provided with two contact switches arranged in the communication loop switching circuit, controllable by the central processing unit;

an incoming call detecting circuit having an input line connected to one of the earphone connecting lines and an output line coupled to the central processing unit, capable of generating an output signal to the central processing unit via the output line when detecting an incoming call;

an audio signal converting circuit having four input lines connected to the earphone connecting lines and the microphone connecting lines of the mobile phone and two output lines, for converting the audio signal carried on the earphone connecting lines and the microphone connecting lines into an audio signal form adapted to be coupled to the phone set via the output lines; and a power supplying circuit connected between the communication loop switching circuit and the output lines of the audio signal converting circuit for supplying a power source to the audio signal converting circuit.

2. The control device as claimed in claim 1, further comprising a ring generation circuit controllable by the central processing unit, capable of generating a simulating ring signal when the incoming call is detected by the incoming call detecting circuit.

3. The control device as claimed in claim 1, further comprising a DTMF decoding circuit coupled to the communication loop switching circuit for receiving and decoding a set of DTMF signal sent from the phone set and then sending a decoded DTMF signal to the central processing unit.

4. A mobile phone battery charger with a switch device for answering an incoming call of a mobile phone by a phone set coupled to a pair of subscriber lines of a public telecom network, the mobile phone being provided with two earphone connecting lines and two microphone connecting lines, the battery charger being provided with a plurality of contacts adapted to be contacted with the earphone connecting lines and the microphone connecting lines of the mobile phone when the mobile phone is mounted on the battery charger, the switch device comprising:

a central processing unit;

a communication loop switching circuit having a pair of output lines coupled to the subscriber lines and a pair of phone set connecting lines coupled to the phone set, capable of establishing a communication loop for the phone set;

a relay provided with two contact switches arranged in the communication loop switching circuit, controllable by the central processing unit;

an incoming call detecting circuit having an input line connected to one of the earphone connecting lines and an output line coupled to the central processing unit, capable of generating an output signal to the central processing unit via the output line when detecting an incoming call;

an audio signal converting circuit having four input lines connected to the earphone connecting lines and the microphone connecting lines of the mobile phone and two output lines, for converting the audio signal carried on the earphone connecting lines and the microphone connecting lines into an audio signal form adapted to be coupled to the phone set via the output lines; and a power supplying circuit connected between the communication loop switching circuit and the output lines of the audio signal converting circuit for supplying a power source to the audio signal converting circuit.

5. The mobile phone battery charger as claimed in claim 4, further comprising a ring generation circuit controllable by the central processing unit, capable of generating a simulating ring signal when the incoming call is detected by the incoming call detecting circuit.

6. The mobile phone battery charger as claimed in claim 4, further comprising a DTMF decoding circuit coupled to the communication loop switching circuit for receiving and decoding a set of DTMF signal sent from the phone set and then sending a decoded DTMF signal to the central processing unit.

7. The mobile phone battery charger as claimed in claim 4, further comprising a battery charging circuit therein.

* * * * *